(12) United States Patent
Patil et al.

(10) Patent No.: US 9,738,821 B2
(45) Date of Patent: Aug. 22, 2017

(54) AMPHOTERIC POLYMER SUSPENDING AGENT FOR USE IN CALCIUM ALUMINATE CEMENT COMPOSITIONS

(71) Applicant: HALLIBURTON ENERGY SERVICES, INC., Houston, TX (US)

(72) Inventors: Rahul C. Patil, Pune (IN); Sandip P. Patil, Pune (IN); Sheetal Singh, Pune (IN)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 46 days.

(21) Appl. No.: 15/062,309

(22) Filed: Mar. 7, 2016

(65) Prior Publication Data

US 2016/0186037 A1 Jun. 30, 2016

Related U.S. Application Data

(62) Division of application No. 14/544,692, filed on Nov. 21, 2013, now Pat. No. 9,315,713.

(51) Int. Cl.

| | |
|---|---|
| *E21B 33/13* | (2006.01) |
| *C04B 28/02* | (2006.01) |
| *C09K 8/467* | (2006.01) |
| *C09K 8/487* | (2006.01) |
| *C04B 28/06* | (2006.01) |
| *C04B 28/10* | (2006.01) |
| *C04B 24/26* | (2006.01) |
| *C04B 24/38* | (2006.01) |

(52) U.S. Cl.
CPC .......... *C09K 8/467* (2013.01); *C04B 24/2676* (2013.01); *C04B 24/2682* (2013.01); *C04B 24/383* (2013.01); *C04B 28/06* (2013.01); *C04B 28/10* (2013.01); *C04B 28/105* (2013.01); *C09K 8/487* (2013.01)

(58) Field of Classification Search
CPC ......... E21B 33/13; C09K 8/487; C09K 8/467; C09K 8/42; C04B 28/02
See application file for complete search history.

(56) References Cited

U.S. PATENT DOCUMENTS

| | | | |
|---|---|---|---|
| 4,687,516 A | 8/1987 | Burkhalter et al. | |
| 5,510,436 A | 4/1996 | Hille et al. | |
| 7,114,569 B2 | 10/2006 | Chatterji et al. | |
| 7,300,973 B2 | 11/2007 | Chang et al. | |
| 7,575,055 B2 | 8/2009 | Reddy et al. | |
| 7,757,766 B2 | 7/2010 | Lewis et al. | |
| 2005/0274519 A1 | 12/2005 | Chatterji et al. | |
| 2008/0308275 A1 | 12/2008 | Brothers et al. | |
| 2010/0240803 A1 | 9/2010 | Lewis et al. | |
| 2012/0090841 A1 | 4/2012 | Reddy et al. | |
| 2012/0210911 A1 | 8/2012 | Tarafdar et al. | |
| 2012/0279707 A1 | 11/2012 | Funkhouser et al. | |
| 2012/0279709 A1 | 11/2012 | Bain et al. | |
| 2014/0094394 A1* | 4/2014 | Bishop | C09K 8/032 507/143 |

\* cited by examiner

*Primary Examiner* — Catherine Loikith
(74) *Attorney, Agent, or Firm* — McGuireWoods, LLP

(57) ABSTRACT

A cement composition for use in a well that penetrates a subterranean formation comprises: a calcium aluminate cement or calcium magnesia cement; water; a fluid loss additive; and a suspending agent, wherein the suspending agent is a polymer and wherein the polymer: (A) is amphoteric; (B) has a molecular weight greater than 100,000; and (C) does not increase the fluid loss of the cement composition greater than 15% at a temperature of 145° F. (63° C.) and a pressure differential of 1,000 psi (7 MPa) compared to a cement composition consisting of the cement, the water, and the fluid loss additive. A method of cementing in a subterranean formation comprises: introducing the cement composition into the subterranean formation; and allowing the cement composition to set.

19 Claims, No Drawings

AMPHOTERIC POLYMER SUSPENDING AGENT FOR USE IN CALCIUM ALUMINATE CEMENT COMPOSITIONS

CROSS-REFERENCE TO RELATED APPLICATIONS

This is a divisional application of co-pending U.S. Non-Provisional Patent Application No. 14/544,692, filed Nov. 21, 2013, entitled AN AMPHOTERIC POLYMER SUSPENDING AGENT FOR USE IN CALCIUM ALUMINATE CEMENT COMPOSITIONS, the disclosure of which is incorporated herein in its entirety.

TECHNICAL FIELD

Suspending agents and fluid loss additives are commonly included in a cement composition. The cement composition can be a high aluminate cement or high magnesia cement. Compatibility between the additives can be achieved by using an amphoteric polymer suspending agent. The cement composition can be used in an oil or gas well.

SUMMARY

According to an embodiment, a cement composition for use in a well that penetrates a subterranean formation comprises: a calcium aluminate cement or calcium magnesia cement; water; a fluid loss additive; and a suspending agent, wherein the suspending agent is a polymer and wherein the polymer: (A) is amphoteric; (B) has a molecular weight greater than 100,000; and (C) does not increase the fluid loss of the cement composition greater than 15% at a temperature of 145° F. and a pressure differential of 1,000 psi compared to a test cement composition consisting of the cement, the water, and the fluid loss additive and in the same proportions as the cement composition.

According to another embodiment, a method of cementing in a subterranean formation comprises: introducing the cement composition into the subterranean formation; and causing or allowing the cement composition to set after the step of introducing.

DETAILED DESCRIPTION OF THE INVENTION

As used herein, the words "comprise," "have," "include," and all grammatical variations thereof are each intended to have an open, non-limiting meaning that does not exclude additional elements or steps.

As used herein, the words "consisting essentially of," and all grammatical variations thereof are intended to limit the scope of a claim to the specified materials or steps and those that do not materially affect the basic and novel characteristic(s) of the claimed invention. For example, a test cement composition can consist essentially of: the cement; the water; the fluid loss additive; and the suspending agent, and in the same proportions as in the cement composition. The test composition can contain other ingredients so long as the presence of the other ingredients does not materially affect the basic and novel characteristics of the claimed invention, i.e., so long as the suspending agent does not increase the fluid loss of the cement composition greater than 15% at a temperature of 145° F. (63° C.) and a pressure differential of 1,000 psi (7 MPa).

As used herein, a "fluid" is a substance that can flow and conform to the outline of its container when the substance is tested at a temperature of 71° F. (22° C.) and a pressure of one atmosphere "atm" (0.1 megapascals "MPa"). A fluid can be a liquid or gas. A fluid can have only one phase or more than one distinct phase. A colloid is an example of a fluid having more than one distinct phase. A colloid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. There can be more than one dispersed phase of a colloid, but only one continuous phase. For example, there can be a continuous phase, which is adjacent to a first dispersed phase, and the first dispersed phase can be adjacent to a second dispersed phase. Moreover, any of the phases of a colloid can contain dissolved materials and/or undissolved solids.

As used herein, a "cement composition" is a mixture of at least cement and water. A cement composition can include additives. As used herein, the term "cement" means an initially dry substance that develops compressive strength or sets in the presence of water. An example of cement is Portland cement. A cement composition is generally slurry in which the water is the continuous phase of the slurry and the cement (and any other insoluble particles) is the dispersed phase. The continuous phase of a cement composition can include dissolved solids.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, an injection well, or a geothermal well. As used herein, a "well" includes at least one wellbore. The wellbore is drilled into a subterranean formation. The subterranean formation can be a part of a reservoir or adjacent to a reservoir. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore, which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During well completion, it is common to introduce a cement composition into an annulus in a wellbore. For example, in a cased-hole wellbore, a cement composition can be placed into and allowed to set in an annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, or squeeze cementing.

During cementing operations, it is necessary for the cement composition to remain pumpable during introduction into the well and until the composition is situated in the portion of the well to be cemented. After the cement composition has reached the portion of the well to be cemented, the cement composition ultimately sets. As used herein, the term "set" and all grammatical variations thereof means the process of becoming hard or solid through curing. A cement composition that thickens too quickly while being pumped can damage pumping equipment or block tubing or pipes, and a cement composition that sets too slowly can cost time and money while waiting for the composition to set.

Often times, a wellbore fluid, such as a cement composition, is modified for use in challenging wellbores. Examples of challenging wellbores include, but are not limited to, high temperature and/or high pressure wells, wells containing high amounts of an acid gas, such as carbon dioxide gas (acid gas wells), steam injection wells, steam production wells, geothermal wells, and wells containing high amounts of a sour gas, such as hydrogen sulfide gas (sour gas wells). For example, at high static subterranean temperatures, and in the presence of brines containing carbon dioxide, conventional cement compositions containing hydraulic cements (e.g., Portland cement), particularly those which exhibit high pH (i.e., greater than 11), rapidly deteriorate due to carbonation of alkaline components of the set cement such as calcium hydroxide. Thus, the use of conventional hydraulic cement compositions, such as Portland cement, in these types of environments may result in the loss of wellbore integrity. An alternative to using conventional hydraulic cements in challenging wellbores is the use of a high alumina content cements or high magnesia content cements. An example of a high alumina content cement is Calcium Aluminate Cements (CACs). These cements can exhibit improved physical and mechanical properties. Some of the improved properties include, better binding to the subterranean formation and/or casing and to itself, a higher compressive strength, carbonation and corrosion resistance, and low permeability.

Additives are commonly included in a cement composition. Two examples of common additives are a suspending agent and a fluid loss additive. A suspending agent can be used to provide a stable composition. As used herein, the term "stable" and all grammatical variations thereof means a fluid that remains homogenous for a specified period of time. As used herein, the term "homogenous" means that less than 20% of undissolved particles settle out of the liquid phase of the fluid. By way of example, the majority of undissolved solids, such as the cement, of a cement composition do not settle to the bottom of the water. The suspending agent inhibits or prevents the solids from settling out.

Fluids, such as water, included in a cement composition can penetrate into the surrounding subterranean formation. This is commonly referred to as fluid loss. The loss of significant amounts of fluid from the cement composition into the formation can adversely affect, inter alia, the viscosity, thickening time, setting time, and compressive strength of the cement composition. Therefore, it is common to include a fluid loss additive in a cement composition in order to help minimize the amount of fluid that is lost from the cement composition into the subterranean formation.

Problems can occur when using traditional additives, for example anionic polymers, in a high alumina or high magnesia content cement. By way of example, commonly-used suspending agents can adversely affect a commonly-used fluid loss additive and vice versa. For example, while the suspending agent might function to provide a stable cement composition, the suspending agent renders the fluid loss additive ineffective for its intended purpose and fluid loss is not controlled. Conversely, the fluid loss additive may provide effective fluid loss control, but render the suspending agent ineffective for providing a stable cement composition. Previous attempts to overcome these problems include decreasing the amount of water in the cement composition so less fluid is available to lose into the formation or to add lightweight additives. However, decreasing the amount of water and/or adding an additional additive, such as a lightweight additive, can negatively affect the density of the cement composition as well as other desirable properties of the composition, such as the compressive strength. Moreover, the addition of a lightweight additive increases the overall cost of formulating the composition and leads to a more complicated cement system. Therefore, there exists a need for additives that can be used in high alumina or high magnesia content cement, which do not adversely affect other additives and their function. The need exists for additives that can be used without having to reduce the amount of water or add additional additives to counterbalance the adverse effects of the additives.

It has been discovered that an amphoteric polymer suspending agent can be used in high alumina or high magnesia content cement compositions. The novel suspending agent does not negatively affect the functionality of a fluid loss additive or other additives. The novel suspending agent can provide a lower cost composition because additional additives are not needed to provide the desired cement composition properties.

A polymer is a large molecule composed of repeating units, typically connected by covalent chemical bonds. The number of repeating units of a polymer can range from approximately 11 to greater than 10,000. The number of repeating units of a polymer is referred to as the chain length of the polymer. A polymer is formed from the polymerization reaction of monomers. During the polymerization reaction, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. In a copolymer, the repeating units from each of the monomers can be arranged in various ways along the polymer chain. For example, the repeating units can be random, alternating, periodic, or block. The conditions of the polymerization reaction can be adjusted to help control the average number of repeating units (the average chain length) of the polymer.

A polymer has an average molecular weight, which is directly related to the average chain length of the polymer. The average molecular weight of a polymer has an impact on some of the physical characteristics of a polymer, for example, its solubility in water, its viscosity, and its biodegradability. For a copolymer, each of the monomers will be repeated a certain number of times (number of repeating units). The average molecular weight for a copolymer can be expressed as follows:

$$\text{Avg. molecular weight} = (M.W.\ m_1 * RU\ m_i) + (M.W.\ m_2 * RU\ m_2)\ldots$$

where M.W. $m_1$ is the molecular weight of the first monomer; RU $m_1$ is the number of repeating units of the first monomer; M.W. $m_2$ is the molecular weight of the second monomer; and RU $m_2$ is the number of repeating units of the second monomer. Of course, a terpolymer would include three monomers, a tetra polymer would include four monomers, and so on.

A polymer can be charged. A polymer with a positive charge is cationic; a polymer with a negative charge is anionic; a polymer with no charge is non-ionic; and a polymer with a positive and negative charge is zwitterionic. A polymer can also be amphoteric. As used herein, the term "amphoteric" and all grammatical variations thereof means a compound or molecule that can act as a Lewis acid and base (i.e., the compound or molecule is capable of accepting and donating a pair of electrons, respectively). An example of an amphoteric compound is zinc oxide (ZnO). ZnO can react with acids and bases to form reaction products. An amphoteric polymer can also be amphiprotic. As used herein, the term "amphiprotic" means a compound or molecule that can act as a Brønsted-Lowry acid and base (i.e., the compound or molecule is capable of accepting and donating a hydrogen atom "$H^+$", respectively). Not all amphoteric polymers are amphiprotic; whereas all amphiprotic polymers are amphoteric. ZnO is an example of a compound that is amphoteric, wherein it can accept and donate an electron pair, but is not amphiprotic because it does not contain a $H^+$ atom to donate. Water ($H_2O$) is the most common amphiprotic substance as it can act as an acid and accept a $H^+$ atom when reacted with a base such as ammonia ($NH_3$) and can act as a base and donate a $H^+$ atom when reacted with an acid such as hydrochloric acid (HCl). An amphoteric polymer can contain both cationic monomer residues and anionic monomer residues. For an amphiprotic polymer, one or more of the monomer residues can contain a $H^+$ atom.

If any laboratory test (e.g., stability) requires the step of mixing, then the treatment fluid is mixed according to the following procedure. The water is added to a mixing container and the container is then placed on a mixer base. The motor of the base is then turned on and maintained at 4,000 revolutions per minute "rpm" (+/−200 rpm). The cement and any other ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s).

It is to be understood that if any laboratory test (e.g., stability) requires the test be performed at a specified temperature and possibly a specified pressure, then the temperature and pressure of the cement composition is ramped up to the specified temperature and pressure after being mixed at ambient temperature and pressure. For example, the cement composition can be mixed at 71° F. (22° C.) and 1 atm (0.1 MPa) and then placed into the testing apparatus and the temperature of the cement composition can be ramped up to the specified temperature. As used herein, the rate of ramping up the temperature is in the range of about 3° F./min to about 5° F./min (about 1.67° C./min to about 2.78° C./min). The purpose of the specific rate of temperature ramping during measurement is to simulate the temperature profile experienced by the cement composition as it is being pumped downhole. After the cement composition is ramped up to the specified temperature and possibly specified pressure, the cement composition is maintained at that temperature and pressure for the duration of the testing.

As used herein, the "thickening time" is how long it takes for a cement composition to become unpumpable at a specified temperature and pressure. The pumpability of a cement composition is related to the consistency of the composition. The consistency of a cement composition is measured in Bearden units of consistency (Bc), a dimensionless unit with no direct conversion factor to the more common units of viscosity. As used herein, a cement composition becomes "unpumpable" when the consistency of the composition reaches 70 Bc. As used herein, the consistency of a cement composition is measured according to API Recommended Practice 10-B2, First Edition, July 2005 as follows. The cement composition is mixed. The cement composition is then placed in the test cell of a High-Temperature, High-Pressure (HTHP) consistometer, such as a FANN® Model 290 or a Chandler Model 8240. Consistency measurements are taken continuously until the cement composition exceeds 70 Bc.

Another desirable property of a cement composition is that the composition exhibit good rheology. Rheology is a measure of how a material deforms and flows. As used herein, the "rheology" of a cement composition is measured according to API Recommended Practice 10-B2, First Edition, July 2005 as follows. The cement composition is mixed. The cement composition is placed into the test cell of a rotational viscometer, such as a FANN® Model 35 viscometer, fitted with a Bob and Sleeve attachment and a spring number 1. The cement composition is tested at the specified temperature and ambient pressure, about 1 atm (0.1 MPa). Rheology readings are taken at multiple revolutions per minute (rpm), for example, at 3, 6, 100, 200, 300, and 600.

A cement composition can develop compressive strength. Cement composition compressive strengths can vary from 0 psi to over 10,000 psi (0 to over 69 MPa). Compressive strength is generally measured at a specified time after the composition has been mixed and at a specified temperature and pressure. Compressive strength can be measured, for example, at a time of 24 hours. As used herein, the "compressive strength" of a cement composition is tested using the non-destructive method according to ANSI/API Recommended Practice 10B-2 as follows. The non-destructive method continually measures correlated compressive strength of a cement composition sample throughout the test period by utilizing a non-destructive sonic device such as an Ultrasonic Cement Analyzer (UCA) available from FANN® Instruments in Houston, Tex. As used herein, the "compressive strength" of a cement composition is measured using the non-destructive method at a specified time, temperature, and pressure as follows. The cement composition is mixed. The cement composition is then placed in an Ultrasonic Cement Analyzer and tested at a specified temperature and pressure. The UCA continually measures the transit time of the acoustic signal through the sample. The UCA device contains preset algorithms that correlate transit time to compressive strength. The UCA reports the compressive strength of the cement composition in units of pressure, such as psi or MPa.

The compressive strength of a cement composition can be used to indicate whether the cement composition has initially set or is set. As used herein, a cement composition is considered "initially set" when the cement composition develops a compressive strength of 50 psi (0.3 MPa) using the non-destructive compressive strength method at a temperature of 212° F. (100° C.) and a pressure of 3,000 psi (20 MPa). As used herein, the "initial setting time" is the difference in time between when the cement and any other ingredients are added to the water and when the composition is initially set.

As used herein, the term "set," and all grammatical variations thereof, are intended to mean the process of becoming hard or solid by curing. As used herein, the "setting time" is the difference in time between when the cement and any other ingredients are added to the water and when the composition has set at a specified temperature. It can take up to 48 hours or longer for a cement composition to set. Some cement compositions can continue to develop compressive strength over the course of several days. The compressive strength of a cement composition can reach over 10,000 psi (69 MPa).

It is desirable that a cement composition have a low sedimentation value for a desired amount of time. As used herein, "sag factor" (SF) testing is performed according to API 10B-2 Recommended Practice for Testing Well Cements Section 15.6 as follows. The cement composition is mixed. The density of the cement composition is measured. The cement composition is then poured into a sedimentation testing tube. The cement composition is then stirred to remove any air bubbles and more cement composition is added to the tube to completely fill the tube. The tube is then sealed and can include an optional pressurization closure to prevent spillage of the composition. The sealed tube is then placed into a water-filled chamber that is pre-heated to the specified testing temperature for a specified period of time. The tube is then removed from the chamber and allowed to cool. The set cement composition is then removed from the tube and placed in water to keep the cement from drying out. The length of the set cement is measured. The cement is then cut or broken into at least two segments approximately 20 millimeters (mm) from the top and bottom of the cement. Each segment is then weighed to determine the sedimentation density of the segment. The sag factor is calculated using the following formula: $SF=SD_{bottom}/(SD_{bottom}+SD_{top})$, where $SD_{bottom}$ is the sedimentation density of the bottom segment and $SD_{top}$ is the sedimentation density of the top segment. A sag factor of greater than 0.50 indicates that the cement composition has a potential to sag; therefore, a sag factor equal to 0.50 is considered to be a good sag factor.

Another desirable property of a treatment fluid is a low fluid loss. As used herein, the "fluid loss" of a cement composition is tested according to API 13B-2 section 7, Recommended Practice for Field Testing of Oil-based Treatment fluids procedure at a specified temperature and pressure differential as follows. The cement composition is mixed. The heating jacket of the testing apparatus is pre-heated to approximately 6° C. (10° F.) above the specified temperature. The cement composition is stirred for 5 min. using a field mixer. The cement composition is poured into a filter cell. The testing apparatus is assembled with a 300 mesh screen inserted into the apparatus. The cement composition is heated to the specified temperature. When the cement composition reaches the specified temperature, the lower valve stem is opened and the specified pressure differential is set. A timer is started and filtrate out of the testing apparatus is collected in a separate volumetric container. The testing is performed for 30 min. The total volume of filtrate collected is read. Fluid loss is measured in milliliters (mL) of fluid collected in 30 min. The total mL of fluid loss is then multiplied by 2 to obtain the API fluid loss for the treatment fluid in units of mL/30 min.

According to an embodiment, a cement composition for use in a well that penetrates a subterranean formation comprises: a calcium aluminate cement or calcium magnesia cement; water; a fluid loss additive; and a suspending agent, wherein the suspending agent is a polymer and wherein the polymer: (A) is amphoteric; (B) has a molecular weight greater than 100,000; and (C) does not increase the fluid loss of the cement composition greater than 15% at a temperature of 145° F. (63° C.) and a pressure differential of 1,000 psi (7 MPa) compared to a test cement composition consisting of the cement, the water, and the fluid loss additive and in the same proportions as the cement composition.

According to another embodiment, a method of cementing in a subterranean formation comprises: introducing the cement composition into the subterranean formation; and causing or allowing the cement composition to set.

It is to be understood that the discussion of preferred embodiments regarding the cement composition or any ingredient in the cement composition, is intended to apply to the composition embodiments and the method embodiments. Any reference to the unit "gallons" means U.S. gallons.

The cement composition includes a calcium aluminate cement (CAC) or calcium magnesia cement (CMC). The CAC comprises at least calcium, aluminum, and oxygen. The CMC comprises at least calcium, magnesium, and oxygen. According to an embodiment, the CAC comprises aluminum oxide ($Al_2O_3$) and calcium oxide (CaO). The aluminum oxide can be present in the CAC in an amount in the range of about 30 weight (wt.) % to about 80 wt. %, alternatively from about 40 wt. % to about 70 wt. %, or alternatively from about 50 wt. % to about 60 wt. %, based upon the total weight of the CAC. The calcium oxide can be present in the CAC in an amount in the range of about 20 wt. % to about 60 wt. %, alternatively from about 30 wt. % to about 50 wt. %, or alternatively from about 35 wt. % to about 40 wt. %, based upon the total weight of the CAC. Additionally, the aluminum oxide to calcium oxide ($Al_2O_3$/CaO) weight ratio in the CAC may vary from about 1:1 to about 4:1, alternatively from about 2:1 to about 1.5:1. An example of a commercially-available calcium aluminate-based cement is ThermaLock™, marketed by Halliburton Energy Services, Inc.

The cement composition includes water. The water can be selected from the group consisting of freshwater, brackish water, and saltwater, in any combination thereof in any proportion. The cement composition can also include a salt. Preferably, the salt is selected from sodium chloride, calcium chloride, calcium bromide, potassium chloride, potassium bromide, magnesium chloride, and any combination thereof in any proportion. Preferably, the salt is in a concentration in the range of about 0.1% to about 40% by weight of the water.

According to an embodiment, the cement composition has a density of at least 9 pounds per gallon "ppg" (1.1 kilograms per liter "kg/L"). The cement composition can have a density in the range of about 9 to about 22 ppg (about 1.1 to about 2.6 kg/L).

The cement composition includes a fluid loss additive. The fluid loss additive can be a liquid, a liquid concentrate, or a solid powder. Preferably, the fluid loss additive is compatible with a CAC or CMC. Compatible means that the fluid loss additive provides desired fluid loss to the cement composition. For example, some fluid loss additives that work well for Portland cements, do not provide the desired fluid loss when used in CAC. The fluid loss additive can comprise hydroxyethylcellulose and derivatives, styrene-co-butadiene polymers, and combinations thereof. Commercially-available examples of suitable fluid loss additives include, but are not limited to, LATEX 3000™, marketed by Halliburton Energy Services, Inc.

According to an embodiment, the fluid loss additive is in a sufficient concentration such that the cement composition has a fluid loss of less than 50, preferably less than 40, more preferably less than 35 mL/30 minutes at a temperature of 145° F. (63° C.) and a pressure differential of 1,000 psi (7 MPa). According to another embodiment, the fluid loss additive is in a sufficient concentration such that a test cement composition consisting of the cement, the water, the fluid loss additive, and the suspending agent has a fluid loss of less than 50, preferably less than 40, more preferably less than 35 mL/30 minutes at a temperature of 145° F. (63° C.) and a pressure differential of 1,000 psi (7 MPa). The fluid loss additive can also be in a sufficient concentration such that the cement composition has a fluid loss of less than 50, preferably less than 40, more preferably less than 35 mL/30 minutes at the bottomhole temperature and pressure of the subterranean formation. As used herein, the term "bottomhole" means the portion of the subterranean formation cemented. According to yet another embodiment, the fluid loss additive is in a concentration in the range of about 0.5 to about 2 gallons per sack "gal/sk" of the cement for a liquid or liquid concentrate fluid loss additive. For a solid powder fluid loss additive, the fluid loss additive can be in a concentration in the range of about 0.2% to about 2% by weight of the cement "bwoc".

The cement composition includes the suspending agent. The suspending agent is a polymer. The suspending agent can be a copolymer. The polymer is amphoteric. The suspending agent can also be amphiprotic. According to an embodiment, the polymer comprises one or more monomer residues that are capable of donating and accepting a pair of electrons. While a single monomer residue can be capable of both, donating and accepting the pair of electrons, there could also be a first monomer residue that is capable of donating a pair of electrons and a second monomer residue that is capable of accepting a pair of electrons. According to another embodiment, the polymer comprises one or more monomer residues that are capable of donating and accepting a hydrogen atom. While a single monomer residue can be capable of both, donating and accepting the $H^+$ atom, there could also be a first monomer residue that is capable of donating a $H^+$ atom and a second monomer residue that is capable of accepting a $H^+$ atom. For a copolymer, the first monomer residue can be in a concentration of about 25 to about 75 mol % of the copolymer. It is to be understood that the polymer can comprise the monomer residues listed as well as other monomer residues not listed. It is also to be understood that the polymer can consists essentially of, or consist of, the monomer residues listed above. For example, the polymer can contain just the monomer residues listed above without additional monomer residues or functional groups being added to the polymer, for reasons such as affecting the amphoteric or amphiprotic nature of the polymer or the suspending capability of the polymer.

The polymer can comprise a first monomer residue and a second monomer residue. The first monomer residue can be cationic and the second monomer residue can be anionic. The first monomer residue can be, without limitation, diallyldimethyl ammonium chloride ("DADMAC"). The second monomer residue can be selected from the group consisting of 2-acrylamido-2-methylpropane sulfonic acid, acrylic acid, methacrylic acid, n,n-dimethyl acrylamide, n-vinylpyrrolidone, and combinations thereof in any proportion.

The polymer has a molecular weight greater than 100,000. According to another embodiment, the polymer has a molecular weight in the range of 100,000 to about 10,000,000.

The polymer does not increase the fluid loss of the cement composition greater than 15%, preferably greater than 10%, at a temperature of 145° F. (63° C.) and a pressure differential of 1,000 psi (7 MPa) compared to a test cement composition consisting of the cement, the water, and the fluid loss additive and in the same proportions as the cement composition. According to an embodiment, the suspending agent is compatible with both the cement and the fluid loss additive. That is—the suspending agent functions as a suspending aid to provide a stable cement composition and also does not substantially decrease the effectiveness of the fluid loss additive.

It is to be understood that while the cement composition can contain other ingredients, it is the compatibility of the suspending agent with the other ingredients in the cement composition that is primarily or wholly responsible for providing a similar fluid loss to the cement composition compared to the test cement composition. For example, a test cement composition consisting essentially of, or consisting of, the cement, the water, the fluid loss additive, and the suspending agent and in the same proportions as the cement composition can have a desirable fluid loss. Therefore, it is not necessary for the cement composition to include other additives, such as a viscosifying agent or other fluid loss additives. It is also to be understood that any discussion related to a "test cement composition" is included for purposes of demonstrating that the cement composition can contain other ingredients, but it is the suspending agent when used in conjunction with the cement and the fluid loss additive that creates the desirable fluid loss based on the compatibility of the suspending agent with the cement and the fluid loss additive. Therefore, while it may not be possible to test in a laboratory the specific cement composition used in a wellbore operation in a laboratory, one can formulate a test cement composition to identify if the ingredients and concentration of the ingredients will provide the stated property (e.g., the polymer does not increase the fluid loss of the cement composition greater than 15% compared to the test composition).

According to an embodiment, the fluid loss additive and the suspending agent are in at least a sufficient concentration such that the fluid loss of the cement composition does not increase greater than 15%, preferably greater than 10%, at a temperature of 145° F. (63° C.) and a pressure differential of 1,000 psi (7 MPa) compared to a test cement composition consisting of the cement, the water, and the fluid loss additive and in the same proportions as the cement composition.

According to an embodiment, the cement composition has a sag factor between 0.49 and 0.51 at a temperature of 145° F. (63° C.) and a time of 24 hr. The suspending agent can be in a sufficient concentration such that the cement composition has a sag factor between 0.49 and 0.51 at a temperature of 145° F. (63° C.) and a time of 24 hr.

The cement composition can have a thickening time of at least 5 hours at a temperature of 145° F. (63° C.) and a pressure of 11,000 psi (76 MPa). The cement composition can also have a thickening time in the range of about 5 to about 15 hours, alternatively of about 10 to about 12 hours, at the bottomhole temperature and pressure of the subterranean formation.

The cement composition can have a compressive strength greater than 1,000 psi (7 MPa), preferably greater than 2,000 psi (14 MPa), at a temperature of 160° F. (71° C.) and a pressure of 3,000 psi (21 MPa). According to another embodiment, the cement composition has a compressive strength greater than 1,000 psi (7 MPa), preferably greater than 2,000 psi (14 MPa), at the bottomhole temperature of the subterranean formation.

The cement composition can have an initial setting time of less than 48, preferably less than 24, hours at the bottomhole temperature of the subterranean formation. The cement composition can have a setting time of less than 48, preferably less than 24, hours at the bottomhole temperature of the subterranean formation.

The cement composition can further include other additives. Examples of other additives include, but are not limited to, a filler, a friction reducer, a light-weight additive, a defoaming agent, a high-density additive, a mechanical property enhancing additive, a lost-circulation material, a filtration-control additive, a thixotropic additive, a set retarder, a set accelerator, and combinations thereof.

The cement composition can include a filler. Suitable examples of fillers include, but are not limited to, fly ash, sand, clays, and vitrified shale. Preferably, the filler is in a concentration in the range of about 5% to about 50% bwoc.

The cement composition can include a friction reducer. Suitable examples of commercially-available friction reducers include, but are not limited to, CFR-2™, CFR-3™, CFR-5LE™, CFR-6™, and CFR-B™, marketed by Halliburton Energy Services, Inc. Preferably, the friction reducer is in a concentration in the range of about 0.1% to about 10% bwoc.

Commercially-available examples of other additives include, but are not limited to, and are marketed by Halliburton Energy Services, Inc. under the tradenames HIGH DENSE® No. 3, HIGH DENSE® No. 4, BARITE™, and MICROMAX™, heavy-weight additives; SILICALITE™, extender and compressive-strength enhancer; WELLLIFE® 665, WELLLIFE® 809, and WELLLIFE® 810 mechanical property enhancers.

The method embodiments include the step of introducing the cement composition into the subterranean formation. The step of introducing can be for the purpose of at least one of the following: well completion; foam cementing; primary or secondary cementing operations; well-plugging; squeeze cementing; and gravel packing. The cement composition can be in a pumpable state before and during introduction into the subterranean formation. In an embodiment, the subterranean formation is penetrated by a well. The well can be, without limitation, an oil, gas, or water production well, an injection well, or a geothermal well. According to this embodiment, the step of introducing includes introducing the cement composition into the well. According to another embodiment, the subterranean formation is penetrated by a well and the well includes an annulus. According to this other embodiment, the step of introducing includes introducing the cement composition into a portion of the annulus.

The method embodiments also include the step of allowing the cement composition to set. The step of allowing can be after the step of introducing the cement composition into the subterranean formation. The method embodiments can include the additional steps of perforating, fracturing, or performing an acidizing treatment, after the step of allowing.

EXAMPLES

To facilitate a better understanding of the present invention, the following examples of certain aspects of preferred embodiments are given. The following examples are not the only examples that could be given according to the present invention and are not intended to limit the scope of the invention.

Unless otherwise stated, each of the cement compositions had a density of 14.6 pounds per gallon (ppg) (1.75 kilograms per liter "kg/L") and contained at least the following ingredients: ThermaLock™ cement comprising calcium aluminate; tap water; Latex-3000™ fluid loss additive; Fe-2™ iron sequestering agent as a set retarder; D-Air 3000L™ defoamer; and various suspending agents listed immediately hereafter. BARAZAN® is a powdered Xanthan gum polymer. FWCA™ is a free water control agent. HALAD®-344 is a fluid loss additive suspending agent. Bentonite is a clay suspending agent. VersaSet is a thixotropic additive for suspension. All of the previous ingredients are marketed by Halliburton Energy Services, Inc. The "Amphoteric Polymer" contained 1:1 mole ratio of a cationic monomer residue of diallyldimethyl ammonium chloride and an anionic monomer residue of 2-acrylamido-2-methylpropane sulfonic acid. The control cement composition #1 did not contain a suspending agent.

Table 1 contains a list of ingredients and each ingredient's concentration. Concentrations are listed in units of either % by weight of the cement (% bwoc) or gallons per sack of the cement (gal/sk).

TABLE 1

| Ingredient | Cement Composition # | | | | | | |
|---|---|---|---|---|---|---|---|
| | 1 | 2 | 3 | 4 | 5 | 6 | 7 |
| ThermaLock ™ (% bwoc) | 100 | 100 | 100 | 100 | 100 | 100 | 100 |
| Water (% bwoc) | 37.26 | 37.25 | 37.23 | 36.70 | 37.72 | 37.40 | 36.66 |
| Latex-3000 ™ (gal/sk) | 1.0 | 1.0 | 1.0 | 1.0 | 1.0 | 1.0 | 1.0 |
| Fe-2 ™ (% bwoc) | 1.0 | 1.0 | 1.0 | 1.0 | 1.0 | 1.0 | 1.0 |
| D-Air 3000L ™ (gal/sk) | 0.04 | 0.04 | 0.04 | 0.04 | 0.04 | 0.04 | 0.04 |

TABLE 1-continued

| Ingredient | Cement Composition # | | | | | | |
|---|---|---|---|---|---|---|---|
| | 1 | 2 | 3 | 4 | 5 | 6 | 7 |
| BARAZAN ® (% bwoc) | — | 0.15 | — | — | — | 0.15 | — |
| FWCA ™ (% bwoc) | — | — | 0.15 | — | — | — | — |
| HALAD ®-344 (% bwoc) | — | — | — | 1.0 | — | — | — |
| Bentonite (% bwoc) | — | — | — | — | 1.0 | — | — |
| VersaSet (% bwoc) | — | — | — | — | — | 0.4 | — |
| Amphoteric Polymer (% bwoc) | — | — | — | — | — | — | 1.0 |

Table 2 contains fluid loss, stability, and sag factor data for the cement compositions. Fluid loss testing was performed at a temperature of 145° F. (63° C.) and a pressure differential of 1,000 psi (7 MPa). Sag factor testing was performed at a temperature of 145° F. (63° C.) and a time of 24 hours.

TABLE 2

| Cement Composition # | Fluid Loss (mL/30 min) | Sag Factor |
|---|---|---|
| 1 | 28 | 0.54 |
| 2 | Blowout | — |
| 3 | Blowout | — |
| 4 | Blowout | — |
| 5 | Blowout | — |
| 6 | Blowout | — |
| 7 | 30 | 0.50 |

As can be seen in Table 2, the control cement composition #1 had a fluid loss of 28 mL/30 min. Compositions #2-6, which contained conventional suspending agents had blowouts with unacceptable levels of fluid loss. This indicates that conventional suspending agents adversely affect the fluid loss additive such that excessive fluid loss occurs. However, as can be seen for composition #7 containing the novel amphoteric, polymer, suspending agent, the fluid loss additive was not adversely affected, and a comparable fluid loss value against composition #1 was obtained. Moreover, compositions #2-6 were not stable—indicating that when used with a calcium aluminate cement, the suspending agent did not function effectively. By contrast, composition #7 was stable and exhibited a lower, more desirable sag factor compared to the control composition #1 that did not contain a suspending agent.

Table 3 contains rheology, thickening time, and compressive strength data for cement composition #7. Rheology testing and thickening time were performed at a temperature of 145° F. (63° C.) and a pressure of 11,000 psi (76 MPa) for thickening time. Compressive strength was performed at a temperature of 160° F. (71° C.), a pressure of 3,000 psi (21 MPa), and a time of 24 hours.

TABLE 3

| Rheology (rpm) | | | | | Thickening Time (hr:min) | Compressive Strength (psi) |
|---|---|---|---|---|---|---|
| 3 | 6 | 100 | 200 | 300 | | |
| 14 | 21 | 125 | 190 | 250 | 11:40 | 1,502 |

As can be seen in Table 3, the cement composition containing the novel amphoteric, polymer, suspending agent exhibited good rheology, thickening time, and compressive strength. This indicates that the suspending agent does not adversely affect other desirable properties of a cement composition.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A cement composition for use in a well that penetrates a subterranean formation comprising:
   a calcium aluminate cement or calcium magnesia cement;
   water;
   a fluid loss additive; and
   a suspending agent, wherein the suspending agent is a polymer and wherein the polymer:
   (A) is amphoteric;
   (B) has a molecular weight greater than 100,000; and
   (C) does not increase a fluid loss of the cement composition greater than 15% at a temperature of 145° F. and a pressure differential of 1,000 psi compared to a test cement composition consisting of the cement, the water, and the fluid loss additive and in the same proportions as the cement composition.

2. The cement composition according to claim 1, wherein the water is selected from the group consisting of freshwater, brackish water, and saltwater, in any combination thereof in any proportion.

3. The cement composition according to claim 1, wherein the cement composition has a density in the range of about 9 to about 22 pounds per gallon.

4. The cement composition according to claim 1, wherein the fluid loss additive is selected from the group consisting of hydroxyethylcellulose and derivatives, styrene-co-butadiene polymers, and combinations thereof.

5. The cement composition according to claim 1, wherein the fluid loss additive is in a sufficient concentration such that the cement composition has a fluid loss of less than 50 mL/30 minutes at a temperature of 145° F. and a pressure differential of 1,000 psi.

6. The cement composition according to claim 1, wherein the fluid loss additive is in a concentration in the range of about 0.5 to about 2 gallons per sack of the cement.

7. The cement composition according to claim 1, wherein the fluid loss additive is in a concentration in the range of about 0.2% to about 2% by weight of the cement.

8. The cement composition according to claim 1, wherein the suspending agent is amphiprotic.

9. The cement composition according to claim 1, wherein the suspending agent is a copolymer.

10. The cement composition according to claim 9, wherein the polymer comprises a first monomer residue and a second monomer residue.

11. The cement composition according to claim 10, wherein the first monomer residue is cationic and the second monomer residue is anionic.

12. The cement composition according to claim 11, wherein the first monomer residue is diallyldimethyl ammonium chloride.

13. The cement composition according to claim 11, wherein the second monomer residue is selected from the group consisting of 2-acrylamido-2-methylpropane sulfonic acid, acrylic acid, methacrylic acid, n,n-dimethyl acrylamide, n-vinylpyrrolidone, and combinations thereof in any proportion.

14. The cement composition according to claim 1, wherein the suspending agent is compatible with both the cement and the fluid loss additive.

15. The cement composition according to claim 1, wherein the cement composition has a thickening time of at least 5 hours at a temperature of 145° F. and a pressure of 11,000 psi.

16. The cement composition according to claim 1, wherein the cement composition has a compressive strength greater than 1,000 psi at a temperature of 160° F. and a pressure of 3,000 psi.

17. The cement composition according to claim 1, wherein the suspending agent is in a concentration in the range of about 0.5% to about 10% by weight of the cement.

18. The cement composition according to claim 1, wherein the cement composition has a sag factor between 0.49 and 0.51 at a temperature of 145° F. and a time of 24 hours.

19. The cement composition according to claim 18, wherein the suspending agent is in a sufficient concentration such that the cement composition has a sag factor between 0.49 and 0.51 at a temperature of 145° F. and a time of 24 hours.

* * * * *